United States Patent [19]

Pratt et al.

[11] Patent Number: 5,371,731
[45] Date of Patent: Dec. 6, 1994

[54] NETWORK TRAFFIC MANAGEMENT

[75] Inventors: Christopher D. Pratt, Ipswich; Amelia Platt, Leicester, both of England

[73] Assignee: British Telecommunications public limited company, London, United Kingdom

[21] Appl. No.: 50,400
[22] PCT Filed: Oct. 9, 1991
[86] PCT No.: PCT/GB91/01750
 § 371 Date: May 10, 1993
 § 102(e) Date: May 10, 1993
[87] PCT Pub. No.: WO92/07438
 PCT Pub. Date: Apr. 30, 1992

[30] Foreign Application Priority Data

Oct. 10, 1990 [GB] United Kingdom ............... 9022042.7
Nov. 20, 1990 [GB] United Kingdom ............... 9025206.5

[51] Int. Cl.⁵ ............................................. H04J 3/14
[52] U.S. Cl. ........................................ 370/13; 370/60; 370/79; 370/94.1; 371/32
[58] Field of Search .................. 370/60, 94.1, 79, 13; 371/32

[56] References Cited

U.S. PATENT DOCUMENTS 5,042,029 8/1991 Hayakawa ............................. 370/60
5,090,011 2/1992 Fukuta et al. ........................ 370/60
5,245,616 9/1993 Olson .................................... 371/32

FOREIGN PATENT DOCUMENTS 0377136 7/1990 European Pat. Off. ....... H04L 1/18

OTHER PUBLICATIONS

PCT International Search Report.
IEEE Network: The Magazine of Computer Communication, vol. 2, No. 1, Jan. 1988, New York US, pp. 72–76; Gerla et al: "Congestion Control in Interconnected Lans".

Primary Examiner—Douglas W. Olms
Assistant Examiner—Russell W. Blum
Attorney, Agent, or Firm—Nixon & Vanderhye

[57] ABSTRACT

A network traffic management system and method for a relay-based communications network such as Frame Mode Bearer Service (FMBS) in which terminals (A and B) are linked by nodes (N) through which calls are routed, consists of setting a Recovery Needed flag at a node on detection of incorrect transmission of a frame or congestion at a node which discards the frame. The destination terminal (B) is notified by transmitting a null frame giving rise to a negative acknowledgement (NAK) received at the source terminal (A). The discarded frame is retransmitted with a Recovery flag set. At the node (N) the Recovery flag is detected and the frame is transmitted toward the destination terminal in the normal way. If the Recovery flag is not set and the Recovery Needed flag is set the frame is discarded. In this way, the rest of the network is not burdened with the transmission of frames that will be discarded by the destination terminal in any event until the discarded frame is correctly received. Furthermore, discarding frames that will not ultimately be transmitted successfully allows more accurate monitoring of successfully completed frame transmissions in order that more accurate billing of the customer can be employed.

13 Claims, 2 Drawing Sheets

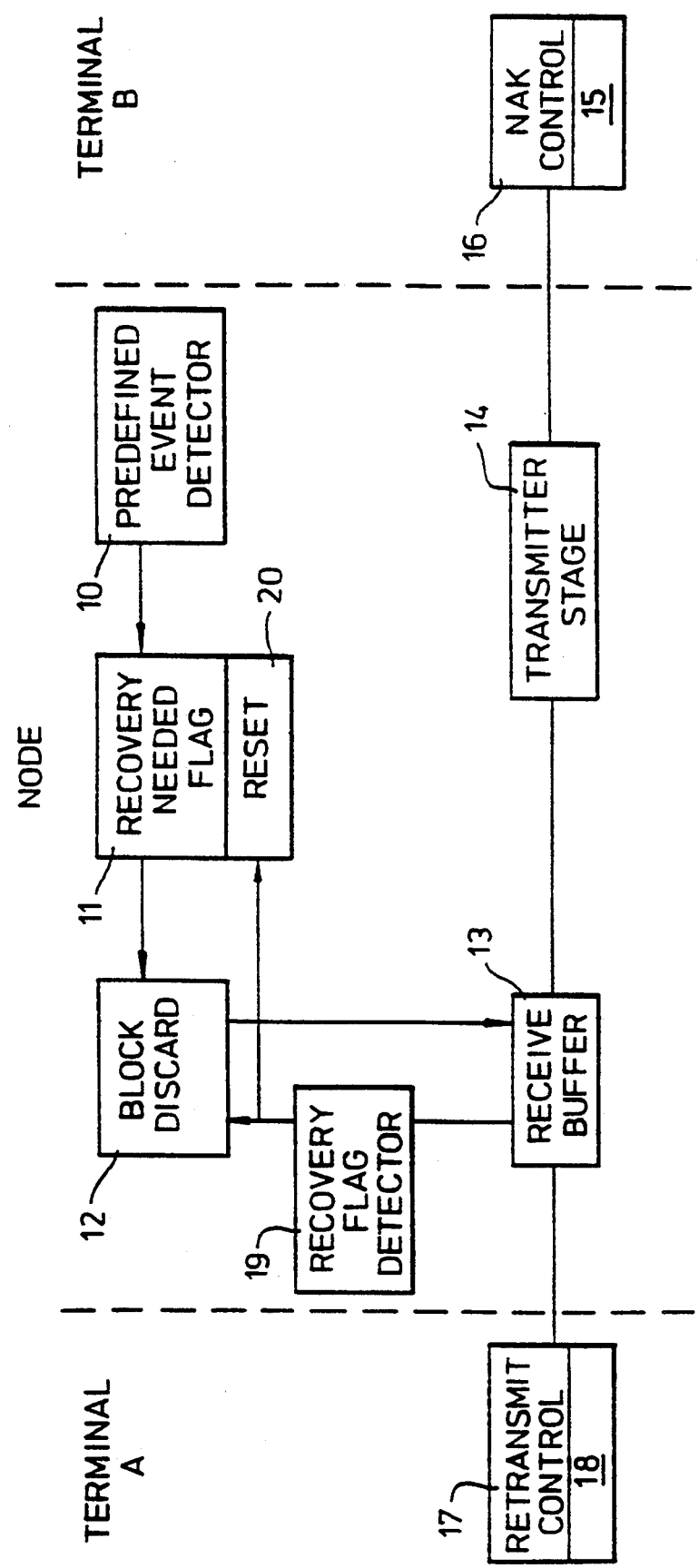

NETWORK TRAFFIC MANAGEMENT

BACKGROUND OF THE INVENTION

1. Field of the Invention

This invention relates to traffic management in a relay-based communications network.

2. Related Art

By "relay-based communications network" is meant any network using a relaying technique for transmitting, for example, blocks or frames of data, such as in nodal networks for packet switching systems. Examples of these are frame mode bearer service (FMBS), as defined in the International Consultative Committee for Telephone and Telegraph (CCITT) publication currently called "The Blue Book" which is a set of recommendations for telecommunication standards, Broadband-ISDN, cell relay and bridged local area networks.

In an FMBS the information is transmitted in frames comprising an address field A, a control field C, an information field I and an error check fiend CRC. This is illustrated in FIG. 1.

Congestion management policy for FMBS has been proposed by the CCITT as recommendation I. 3XX in the latest version of the above publication.

The header of a frame for use in FMBS has a flag in it called the "discard eligibility indicator" (DEI). If a node is congested and some frames must be discarded to ease the problem, the frames with the DEI flag set are chosen for discard in preference to frames not having this flag set. This flag can be set by the source terminal (i.e. the originator of the frames) or the ingress node (i.e. the first node on the virtual circuit through the network). In theory, for any call the proportion of frames with the DEI set can vary between 0 and 100%. The proportion is determined by the quality of service requested by the source terminal and confirmed/negotiated by the network when the virtual call is established. Thus, in the event of congestion, a decision as to which frames to discard is based solely on whether the DEI flag is set. No regard is paid to such things as the maximum delay negotiated by the call at the time of set up.

Correct reception of a frame or a group of frames is confirmed by the destination terminal transmitting a positive acknowledgement signal to the source terminal. Faulty transmission in such a system may include, for example, corrupted data due to noise and/or lack of reception of the data at the correct address. Corrupted data may give rise to a negative acknowledgement signal (NAK), as opposed to a positive one, transmitted from the destination terminal to the source terminal. At, for example, 2 Mbit/sec transmission rates, due to the delay between detection of a corrupted frame and receipt of the NAK at the source terminal, a number of subsequent frames will have been transmitted between the same source and destination terminals before correction of the error can be initiated. Upon the absence of the expected transmitted frame thus giving rise to the NAK, the destination terminal will discard all subsequently received frames until the frame in error is received correctly. Thus, the source terminal employs a "GO BACK N" protocol on receipt of a N which identifies the last correctly received frame and thus the N frames needing to be retransmitted. Hence the NAK causes retransmision of the N frames following the last correctly received frame. After retransmission, transmission of subsequent frames is resumed.

Because frames that will, in any event, be discarded by the destination terminal are transmitted through the network, congestion is exacerbated by the unnecessary transmission of the redundant frames.

Furthermore, and more importantly to the customer, it is not possible to bill accurately for successfully transmitted frames as it is not possible to discriminate between legitimately received frames and those received and rejected subsequent to transmission of a previously discarded frame. Billing monitoring is normally located at the egress node in a network (i.e. that adjacent the destination terminal in a virtual call route) which simply notes the reception of frames without being able to distinguish between original transmission of frames, which should be written off, and retransmission of those which can legitimately be billed.

Various techniques for congestion control are disclosed in the article "congestion control in interconnected LANs" by M. Gerla et al., IEEE Network, vol 2, No. 1, January 1988, pages 72 to 76. These include indiscriminate dropping of packets in datagram networks is when a node buffer becomes full, the task of retransmitting the packets being part of the lower levels of the internodal protocol; node input buffer limiting, which is a similar technique favouring transmit traffic rather than local traffic; a choke or quench technique in which the source terminal is informed of congestion to the destination terminal and slows or stops transmission for a period of time; a backpressure technique in a virtual connection wherein nodes progressively reduce the window for packets by not returning credits to upstream nodes; and a variation of this last technique in which when a frame is dropped the destination terminal returns a Reject frame to the source terminal which sets the window to "1" and retransmits the frame, the window being gradually expanded as more frames are transmitted and acknowledged.

These techniques are concerned with throughput problems of bridges and routers interconnecting LANs, and none is concerned with the problem of billing at a destination node those frames or packets which are accepted by the node and forwarded to, but subsequently rejected by, the destination terminal.

A protocol is known from EP-A-0377162 employing a "Go-Back-N" algorithm in which a receiving terminal sends an error message (identifying the frame sequence number, N) on receipt of a frame containing an error. The terminal rejects all subsequently received frames until it receives a correct version of frame N. This protocol is used for terminal-to-terminal error correction and is not appropriate to link control in a relay-based communications network.

SUMMARY OF THE INVENTION

According to the present invention there is provided a network traffic management system for a relay-based communications network comprising terminals (A and B), arranged to respond to receipt of blocks of information with positive or negative acknowledgement signals, as appropriate, and at least one node (N) through which blocks of information are routed between the said terminals, the system comprising:

means for discarding at a node a block transmitted from a source terminal to an addressed terminal, in the event that a predefined event has occurred;

means for setting a Recovery Needed flag at said node upon the occurrence of the predefined event;

means for transmitting to the addressed terminal an event occurrence signal such as to solicit a negative acknowledgement signal from the addressed terminal which is relayed to the source terminal;

means for retransmitting the discarded block with a set Recovery flag from the source terminal, in response to the receipt of the negative acknowledgement signal;

means for detecting the set Recovery flag at said node;

means at said node for transmitting the block towards the addressed terminal in the event that the Recovery Needed flag and the Recovery flag are set, the means for discarding a block being arranged to discard any block in the event that the Recovery Needed flag is set and the Recovery flag of that block is not set; and means for resetting the Recovery Needed flag on detection of the set Recovery flag in a block at said node.

The event which occurs may be congestion of the node in question or detection of an error in a block at a node or the destination terminal.

A method of network congestion management in a relay-based communications network comprising terminals (A and B), arranged to respond to receipt of blocks of information with positive or negative acknowledgement signals, as appropriate, and at least one node (N) through which blocks of information are routed between the said terminals, the method comprising:

discarding at a node a block transmitted from a source terminal to an addressed terminal, in the event that a predefined event has occurred;

setting a Recovery Needed flag at said node upon the occurrence of the predefined event;

transmitting to the addressed terminal an event occurrence signal such as to solicit a negative acknowledgement signal from the addressed terminal which is relayed to the source terminal;

retransmitting the discarded block with a set Recovery flag from the source terminal, in response to receipt of the negative acknowledgement signal;

detecting the set Recovery flag at a node having a settable Recovery Needed flag;

transmitting a block from said node towards the addressed terminal in the event that the Recovery Needed flag and the Recovery flag are set;

discarding any block in the event that the Recovery Needed flag is set and the Recovery flag of that block is not set; and resetting the Recovery Needed flag on detection of the set Recovery flag in a block at said node.

In the event of congestion, the node may target blocks for discard based on the delay negotiated at call set up and the proximity of the source terminal to the congested node. This may be based, for example, on the number of node to node links between terminals. When call blocks are targeted, the node may be arranged to set the Recovery Needed flag, thus ensuring blocks making up the targeted call are discarded. The node, preferably the ingress node, is able to manage congestion in this way by discarding calls before they enter deeply into the network. Furthermore, the discarding of blocks of targeted calls is preferable to discarding blocks of calls indiscriminately. In the latter case blocks from calls will have to be retransmitted at some stage for all calls indiscriminately selected for block discard, whereas only the targeted calls are required to have retransmission in the former case. This has the effect of discarding sufficient frames to ease the congestion immediately without disrupting an excessive number of calls.

Thus, all blocks of information following on from a first discarded block are discarded at the detecting node so that the network does not have to bear the load of blocks, e.g. frames, transmitted which will, in any event, be rejected by the destination terminal until the block in error is successfully transmitted.

Billing is also made more accurate as the only blocks transmitted by the egress node to the destination terminal will be those correctly received in sequence. Clearly, there is the possibility that data will be corrupted between the egress node and the destination terminal, but the level of excess billing resulting from the inability to detect blocks transmitted as a result of errors in this final link in the network is significantly less than was previously the case.

Preferably, the event occurrence signal is in the form of a null block. The source terminal initiates retransmission of the said block with the Recovery flag set on receipt of the negative acknowledgement signal. By using a null block the appropriate negative acknowledgement signal can be solicited from the destination terminal quickly after the need for discard arises.

The invention can be put into practice in various ways specific embodiments of which will now be described by way of example with reference to the accompanying drawings in which:

BRIEF DESCRIPTION OF THE DRAWINGS

FIG. 4 is a schematic block diagram of component parts of the node.

DETAILED DESCRIPTION OF EXEMPLARY EMBODIMENTS

Figure 1:
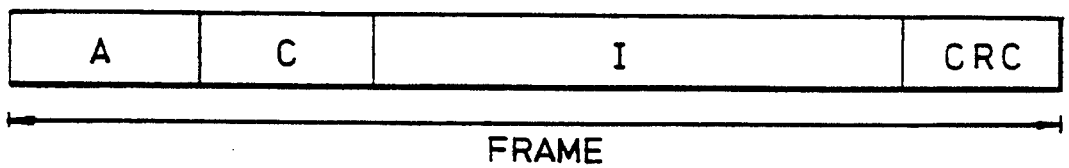
FIG. 1 shows the frame format in an FMBS.
Figure 2:
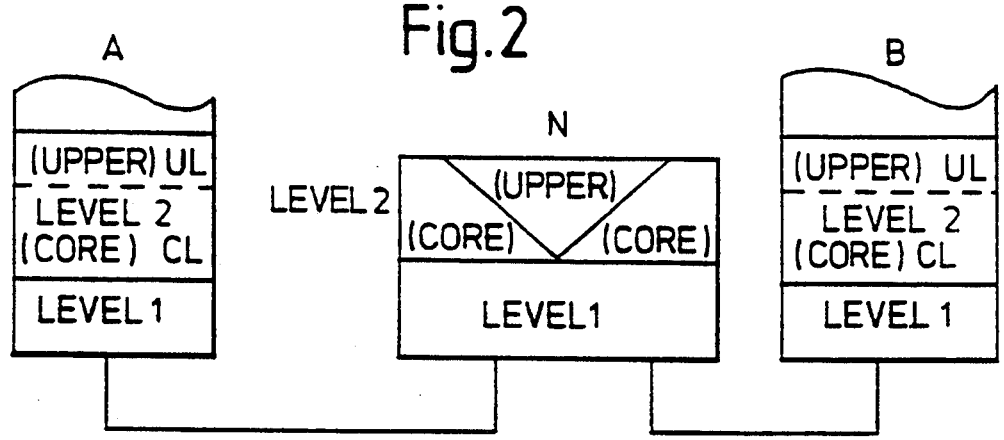
FIG. 2 is a schematic block diagram of a single node FMBS network.

As mentioned, in an FMBS the information is transmitted in frames comprising an address field A, a control field C, an information field I and an error check field CRC. Such a frame constitutes a block of the present invention, Referring to FIG. 2, the terminal and node structure of the network comprises a two-level arrangement. The first, physical level 1 provides the functional and procedural characteristics to activate, maintain and deactivate the physical connections between the constituent parts of the network. The second, data link level 2 provides the synchronisation and error control from the information transmitted over the physical link. These layers are in accordance with the definitions in the International Standards Organisation Open Systems Interconnection (OSI) Layers Reference Model which will be well known to the person skilled in the art. Of course, the terminals are likely to be provided with further of the seven levels in the OSI Layers Reference Model.

The level 2 of the terminals are notionally split into an upper layer (UL) and a core layer (CL). The upper layer sets up the information to be transmitted with appropriate control fields and is dedicated to managing reliable communication of data over the network. The core layer, which is the same in the terminals and the node or nodes, adds appropriate address and error checking fields to the information and control fields established by the upper level.

Clearly, a single node network is a simplification of a real network in which a plurality of nodes will interconnect a plurality of terminals.

Under normal circumstances, a virtual call will be set up along a particular route through the network. A series of successfully transmitted frames of information transmitted from the source terminal A to the destination terminal B are acknowledged by transmission int he opposite direction of a successful acknowledgement signal. In the event that no acknowledgement is received within a period, the source terminal registers a "timeout" fault, inhibits further transmission of subsequent frames and retransmits the series of unacknowledged frames in sequence.

In FMBS the recovery mechanism for successful transmission of a frame of data is an end-to-end function, i.e. the source terminal will receive either an implicit (timeout) recovery signal or an explicit (NAK) signal. When an error in a frame is detected by a node in a virtual call or the node is congested (or anticipates congestion) it discards the frame in error or as a result of a congestion indication.

It will be apparent to the skilled person that a source terminal can also function as a destination terminal, and vice versa. A full duplex call between two terminals may use the same route through the network or different ones for each direction.

The present invention is designed to avoid unnecessary transmission of frames through the network once retransmission following frame discard has been signalled as necessary.

Figure 3:
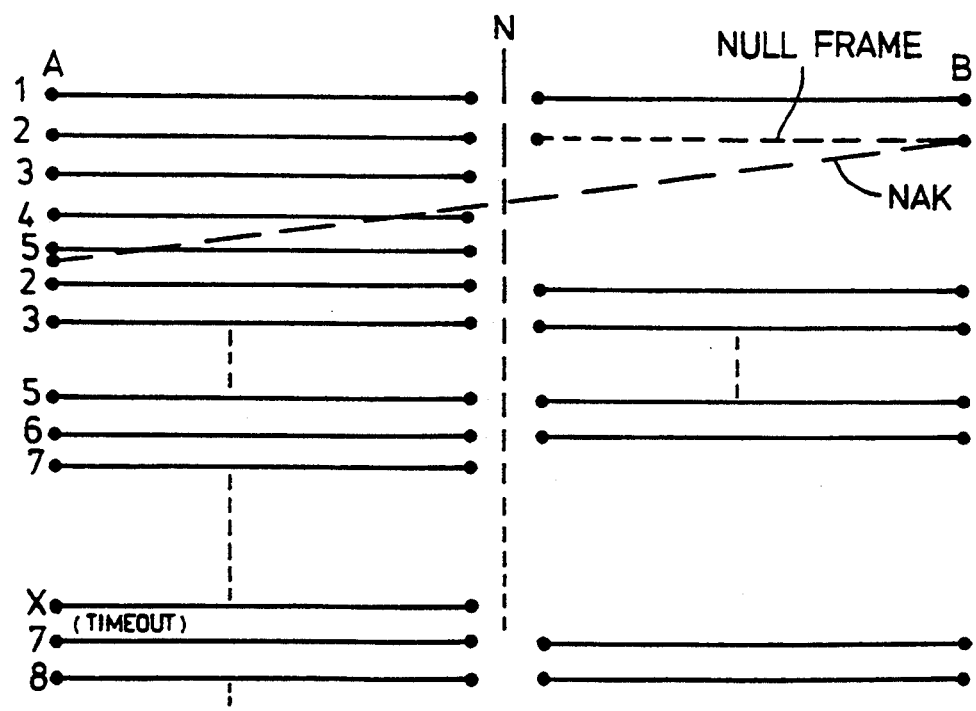
FIG. 3 is a schematic diagram of a series of blocks for a virtual call made on the network of FIG. 2.

Referring to FIG. 3, when a frame in error is received by a node N or the node becomes congested a Recovery Needed flag is set by the node and the frame is discarded, i.e. it is not transmitted to the next node or to the addressed destination terminal B. Instead, a null frame, i.e. a frame without an information field, is transmitted to the addressed destination terminal which inevitably results in a NAK signal being sent back to the source terminal through the network. When the node N discards a frame it sets its own Recovery Needed flag, specific to the virtual call and direction of transmission to which the discarded frame belongs. With the Recovery Needed flag set, all frames transmitted subsequent to the discarded frame are also discarded by the node until a frame with the Recovery flag set is received. Normally this will be a copy of the originally discarded frame. Thus, the network downstream of the node N is not burdened with redundant transmissions of frames that would be rejected by the destination terminal B while the discarded frame remains unrecovered.

On receipt at the source terminal A of the NAK from the destination terminal, the discarded frame is retransmitted with the Recovery flag set in the header.

On receipt of a frame, the node checks whether its Recovery Needed flag is set or reset (i.e. not set). If it is set, then the node N has previously discarded frames for this virtual call. The Recovery flag in the frame header is then checked by the node. If this is also set, then the indication is that the source terminal has initiated a recovery and that this frame is the first to be retransmitted under the GO BACK N protocol. In this case, the Recovery Needed flag is now reset and the frame is processed and forwarded by the node N as normal.

However, if the Recovery flag in the frame header is not set, then the frame is discarded. This is because the Recovery flag not being set is an indication that the frame is one transmitted before the NAK signal was received by the source terminal and acted upon.

If the Recovery Needed flag is not set, the frame will be processed and forwarded in the normal way. In this regard, it is important to note that the Recovery flag in the frame header may still be set. This indicates that a node further along the network route has its Recovery Needed flag set and requires a retransmission of the frame. However, a set Recovery flag will have no effect on the processing at a node unless the Recovery Needed flag is set.

This processing of a frame at a node can be summarised as follows:

If the Recovery Needed flag is set (at the node) and the Recovery flag is set (in the frame) then the Recovery Needed flag is reset (because recovery has been initiated starting with this frame). The frame is then processed as normal.

If the Recovery Needed flag is set (at the node) and the Recovery flag is set (in the frame) then the Recovery Needed flag is reset (because recovery has been initiated starting with this frame). The frame is then processed as normal.

If the Recovery Needed flag is set and the Recovery flag is not set then the frame is discarded (because recovery is still needed but has not been initiated by the source terminal).

If the Recovery Needed flag is not set, the frame is processed as normal.

As an alternative recovery technique or in addition to that described above, the retransmission of data can be arranged to rely on timeout as a result of the lack of any acknowledgement of a predetermined number of frames sent.

When the node discards a frame the Recovery Needed flag is set. All subsequent frames are discarded by the node and are not relayed to the destination terminal B. After a number of frames have been transmitted by the source terminal A, the system will "timeout" through the lack of acknowledgement from the destination terminal. As a result, the source terminal will initiate retransmission on the GO BACK N principle starting with the frame immediately after the last to be positively acknowledged. This may be after the response to a polling signal, sent to the destination terminal, is received by the source terminal. This time, retransmission of this first frame would be accompanied by a set Recovery flag. At the node, the Recovery Needed flag is reset on receipt of the first retransmitted frame with the Recovery flag set. This frame and subsequent frames are then processed as normal and forwarded toward the destination terminal.

However, the timeout mode for initiating retransmission of frames may well be slower than the use of the previously described NAK signal on receipt of a null frame because the source has to wait until a set time, corresponding to a set number of frames having been sent, has elapsed before it will act to initiate recovery.

However, in both embodiments a more accurate account of the effective through-put between terminals on a network is available at the egress node. With the exception of frames corrupted between the egress node and the destination terminal, the egress node will never send other than null frames that the destination terminal will reject when this form of the invention is used.

Thus, the present invention provides a means of more accurate billing based on successful data frame transmission. Advantageously, the billing monitoring is located at the egress Node in order to minimise the billing of redundantly transmitted frames.

The invention can be used to save the resources in a network, such as bandwidth requirements and buffer space.

By targeting the frames to be discarded at a node according to the Recovery Needed flag the number of calls disturbed is minimised. This is preferable to discarding frames simply because their DEI flags are set as this may cause many more calls to be disturbed, resulting in more retransmissions, further exacerbating the congestion problem. However, the present invention could also be used in conjunction with DEI flag-based systems. In this case, the number of calls disturbed will also be minimised resulting in fewer retransmissions.

The Recovery Needed flag specific to a call must be checked for every information frame received at the node. However, since the Recovery Needed flag is advantageously located in the switch table which is consulted anyway in order to carry out the input/output logical link identifier (LLI) translation, the overheads associated with this traffic management technique are minimal and may be carried out in hardware at the core layer of level 2.

The invention is applicable to calls which operate a window. To work in conjunction with other calls, either the node must be able to differentiate between two types of calls and only set the Recovery Needed flag for windowed calls, or the source terminal could set the Recovery flag in all information frames.

The closer is the source terminal to the node which has the Recovery Needed flag set the more network resources can be saved as this is the node which discards the frames. A form of consolidated link layer management could be used to inform nodes upstream in a network route that a recovery is needed for specified virtual calls.

FIG. 4 shows the various means of the present invention in the node and terminals A and B. In the node there is a predefined event detector 10 which as mentioned can detect an error in a frame intended for onward transmission and can also detect congestion, or anticipated congestion, at the node. An output from detector 10 is fed to a Recovery Needed flag circuit 11 which in turn feeds a control signal to a Block Discard circuit 12 which sends an inhibit signal to a receive buffer 13 so that as soon as a predefined event has occurred no further data frames are forwarded to a transmitter stage 14 of the node, but a null frame is sent on to receiving equipment 15 at terminal B. On receipt of the null frame, a Negative Acknowledgement control 16 returns a NAK signal (via a return path, not shown) to terminal A where a retransmit control 17 cooperates with transmitting equipment 18 to se a Recovery flag in the first of a group of retransmitted frames.

In the node, a Recovery flag detector 19 detects the arrival of the frame having its Recovery flag set, and sends a signal to the Block Discard circuit 12 which then generates the inhibit signal, and also sends a signal to a Reset circuit 20 which resets its associated Recovery Needed flag circuit 11.

Whereas described above the node responds to the event occurrence by forward transmitting a null frame which results in the backward transmission of a negative acknowledgement (these forward and backward transmissions together constituting the transmission of an event occurrence signal to the source terminal), in an alternative embodiment the node can transmit an event occurrence signal directly to the source terminal, which may be any suitable signal (e.g. a bit or group of bits, a null frame, or a discard-type frame). Similarly, depending on the recognition circuitry of the destination terminal, the null frame forwarded to the destination terminal can be replaced by any other such suitable signal.

Where the node sends an event occurrence signal directly to the source terminal, the source terminal will respond by sending a request signal to the destination terminal to enquire the current situation. Normally the destination terminal will respond with the frame number of the next expected correct frame.

Instead of setting the Recovery flag of only the first frame of a group of retransmitted frames, in alternative embodiments, the source terminal sets the Recovery flag of all retransmitted frames, and the node resets its Recovery Needed flag as in the above-described preferred embodiment or after transmitting the same number of retransmitted frames as the number of frames which it discarded, and for this latter feature the node can use an up/down counter.

However, such alternative embodiments are not as efficient at congestion management as the preferred embodiment wherein only the first retransmitted frame has its set Recovery flag set, and the node resets its Recovery Needed flag upon receipt of a frame having its Recovery flag set.

We claim:

1. A network traffic management system for a relay-based communications network comprising terminals (A and B), arranged to respond to receipt of blocks of information with positive or negative acknowledgement signals, as appropriate, and at least one node (N) through which blocks of information are routed between the said terminals, the system comprising:

means for discarding at a node a block transmitted from a source terminal to an addressed terminal, in the event that a predefined event has occurred;

means for setting a Recovery Needed flag at said node upon the occurrence of the predefined event;

means for transmitting to the addressed terminal an event occurrence signal such as to solicit a negative acknowledgement signal from the addressed terminal which is relayed to the source terminal;

means for retransmitting the discarded block with a set Recovery flag from the source terminal, in response to the receipt of the negative acknowledgement signal;

means for detecting the set Recovery flag at said node;

means at said node for transmitting the block towards addressed terminal in the event that the Recovery Needed flag and the Recovery flag are set, the means for discarding a block being arranged to discard any block in event that the Recovery Needed flag is set and the Recovery flag of that block is not set; and means for resetting the Recovery Needed flag on detection of the set Recovery flag in a block at said node.

2. A system as claimed in claim 1, wherein said event occurrence signal is in the form of a null block.

3. A system as claimed in claim 1, in which the means for retransmitting is arranged to retransmit a group of discarded blocks with the first only of the group having the Recovery flag set, and the rest of the group having the Recovery flag not set.

4. A system as claimed claim 1, in which a plurality of blocks constitute a virtual call transmitted on a set route through the network, and in which said node assigns a specific Recovery Needed flag to each call.

5. A system as claimed in claim 1, in which the predefined event is congestion, or anticipated congestion, at said node.

6. A system as claimed in claim 1, in which the predefined event is reception of a block in error at said node.

7. A system as in claim 1 in combination with a frame mode bearer service network.

8. A method of network congestion management in a relay-based communications network comprising terminals (A and B), arranged to respond to receipt of blocks of information with positive or negative acknowledgement signals, as appropriate, and at least one node (N) through which blocks of information are routed between the said terminals, the method comprising:
discarding at a node a block transmitted from a source terminal to an addressed terminal, in the event that a predefined event has occurred;
setting a Recovery Needed flag at said node upon the occurrence of the predefined event;
transmitting to the addressed terminal an event occurrence signal such as to solicit a negative acknowledgement signal from the addressed terminal which is relayed to the source terminal;
retransmitting the discarded block with a set Recovery flag from the source Terminal, in response to receipt of the negative acknowledgement signal;
detecting the set Recovery flag at a node having a settable Recovery Needed flag;
transmitting a block from said node towards the addressed terminal in the event that the Recovery Needed flag and the Recovery flag are set;
discarding any block in the event that the Recovery Needed flag is set and the Recovery flag of that block is not set; and
resetting the Recovery Needed flag on detection of the set Recovery flag in a block at said node.

9. A method as claimed in claim 8, in which said signal transmitted by said node to the destination terminal is in the form of a null block.

10. A method as claimed in claim 8, in which a group of discarded blocks is retransmitted with the first only of the group having the Recovery flag set, and the rest of the group having the Recovery flag not set.

11. A method as claimed in claim 8, in which a plurality of blocks constitutes a virtual call transmitted on a set route through the network, and in which said node assigns a specific Recovery Needed flag to each call and for each direction of transmission.

12. A method as claimed in claim 8, in which the predefined event is congestion, or anticipated congestion, at said node.

13. A method as claimed in claim 8, in which the predefined event is reception of a block in error at said node.

* * * * *